US009627961B1

(12) United States Patent
Wu et al.

(10) Patent No.: US 9,627,961 B1
(45) Date of Patent: Apr. 18, 2017

(54) MIXED POWER SUPPLY DEVICE WITH A MERGING NETWORK SWITCH

(71) Applicant: NATIONAL CHUNG SHAN INSTITUTE OF SCIENCE AND TECHNOLOGY, Taoyuan (TW)

(72) Inventors: Chi-Sheng Wu, Taoyuan (TW); Kuo-Kuang Jen, Taoyuan (TW); Hsuang-Chang Chiang, Miaoli (TW); Tsang-Li Tai, Miaoli (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 19 days.

(21) Appl. No.: 14/966,109

(22) Filed: Dec. 11, 2015

(51) Int. Cl.
  *H02M 3/04* (2006.01)
  *H02M 7/53* (2006.01)
  *H02M 7/537* (2006.01)

(52) U.S. Cl.
  CPC ............ *H02M 3/04* (2013.01); *H02M 7/537* (2013.01)

(58) Field of Classification Search
  CPC .......... H02M 3/04; H02M 7/06; H02M 7/537; H02M 7/48; H02M 2001/008; H02M 2001/0012
  See application file for complete search history.

(56) References Cited

U.S. PATENT DOCUMENTS

| 5,493,485 | A * | 2/1996 | Okado | H02H 7/1227 363/56.01 |
| 6,407,536 | B1 * | 6/2002 | Ogusa | G05F 1/70 323/207 |
| 7,138,728 | B2 * | 11/2006 | LeRow | H02J 3/38 307/30 |
| 7,408,268 | B1 * | 8/2008 | Nocentini | H02J 3/38 307/16 |
| 7,945,413 | B2 * | 5/2011 | Krein | H02M 1/32 702/109 |
| 2004/0080165 | A1 * | 4/2004 | Geis | F01D 15/08 290/52 |
| 2005/0073783 | A1 * | 4/2005 | Luo | H02M 7/493 361/62 |
| 2006/0293798 | A1 * | 12/2006 | Luo | H02M 7/493 700/286 |

(Continued)

*Primary Examiner* — Matthew Nguyen
*Assistant Examiner* — Yusef Ahmed
(74) *Attorney, Agent, or Firm* — Schmeiser, Olsen & Watts, LLP

(57) ABSTRACT

A mixed power supply device includes a power supply component for providing a DC voltage; a DC-DC conversion module coupled to the power supply component to receive the DC voltage and output a stable DC voltage; a current transformation module coupled between the DC-DC conversion module and a load to receive the stable DC voltage and convert the stable DC voltage into an AC voltage; and a merging network switching switch coupled to the current transformation module to connect the current transformation module and a utility power network in parallel or disconnect the current transformation module from the utility power network, allowing a load to receive merging network mode-based power supply or standalone mode-based power supply, wherein, in the merging network mode, the current transformation module performs unbalanced current compensation on load unbalance of the load.

9 Claims, 2 Drawing Sheets

(56) References Cited

U.S. PATENT DOCUMENTS

Figure 1:
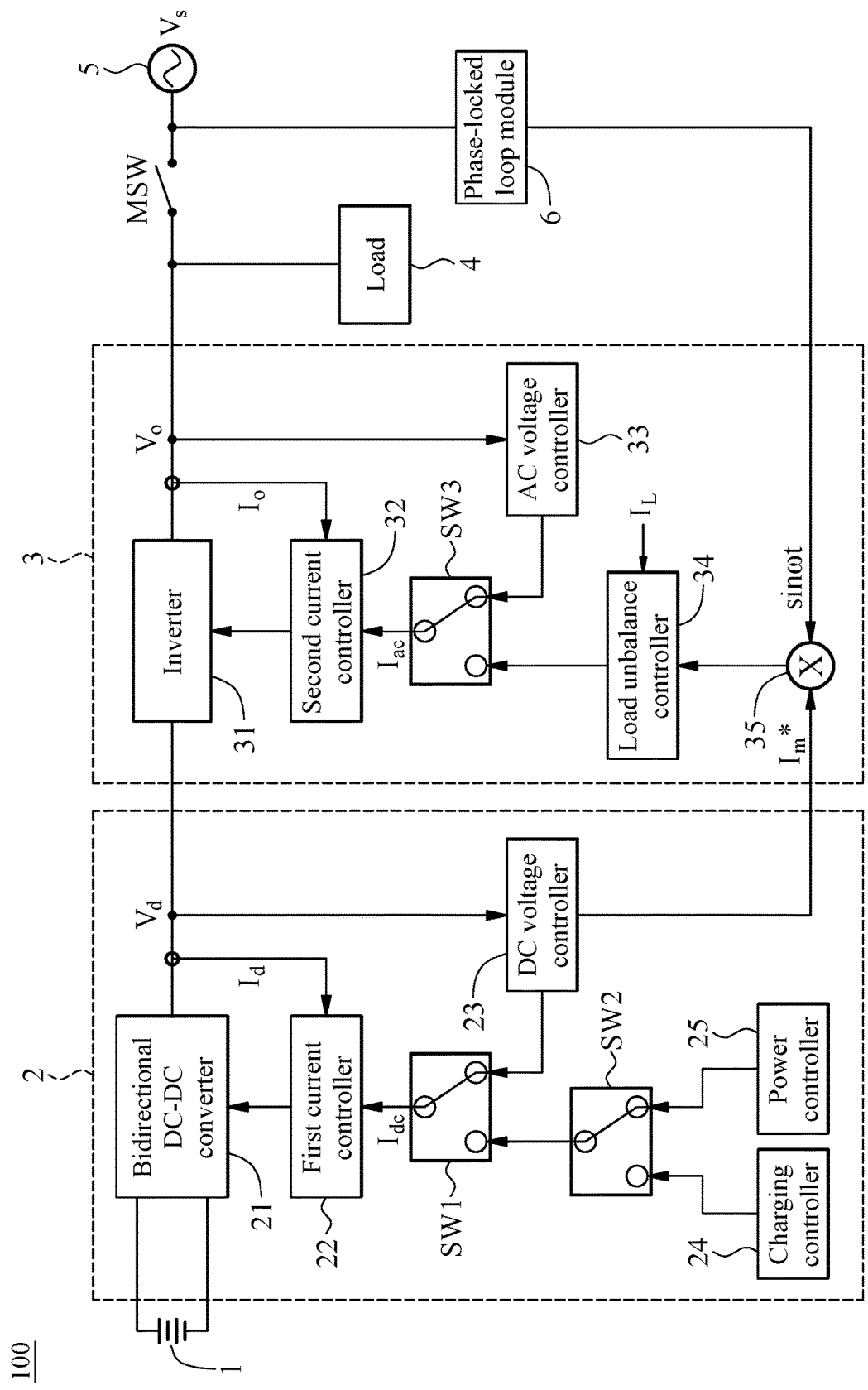

| | | | | |
|---|---|---|---|---|
| 2007/0222297 A1* | 9/2007 | Hung | ................... | H02J 7/0068 |
| | | | | 307/66 |
| 2009/0009005 A1* | 1/2009 | Luo | ...................... | H02M 7/493 |
| | | | | 307/82 |
| 2011/0317460 A1* | 12/2011 | Garces Rivera | ........ | H02M 7/48 |
| | | | | 363/127 |
| 2012/0250369 A1* | 10/2012 | Furukawa | ......... | H02M 3/33584 |
| | | | | 363/25 |
| 2014/0211521 A1* | 7/2014 | Mazumder | .............. | H02M 7/48 |
| | | | | 363/40 |
| 2014/0247632 A1* | 9/2014 | Phadke | .................. | H02M 7/02 |
| | | | | 363/95 |
| 2015/0069844 A1* | 3/2015 | Wu | .......................... | H02J 3/32 |
| | | | | 307/74 |
| 2016/0181809 A1* | 6/2016 | Chiang | .................. | H02J 3/383 |
| | | | | 307/82 |

\* cited by examiner

US 9,627,961 B1

MIXED POWER SUPPLY DEVICE WITH A MERGING NETWORK SWITCH

FIELD OF TECHNOLOGY

The present invention relates to mixed power supply devices and more particularly to a mixed power supply device capable of load unbalance compensation.

BACKGROUND

In a single-phase power supply system, single-phase three-wire power distribution is usually effectuated with a single-phase transformer disposed on a second-order routing side and characterized by a center tap structure. In event of load unbalance, the aforesaid power distribution is predisposed to voltage unbalanced, transformer saturation and overheating. To prevent the aforesaid problems, it is necessary to limit the extent of load unbalance at the expense of power supply level. To overcome the aforesaid drawback of the prior art, it is important to compensate for unbalanced current in the presence of load unbalance with a view to maintaining the initial system power supply level; to this end, a single-phase three-wire inverter is used to not only effectuate the compensation but also dispense with a transformer. Furthermore, past research about single-phase three-wire inverter circuits mainly focuses on three-leg switching control and requires a control framework whereby a single-phase three-wire system is decoupled to enable common-mode and different mode systems for control purposes, that is, turning the systems into one 220V system and two 110V systems, and the control of the two 110V systems is rendered decoupled. The aforesaid control techniques are complicated, and the central leg of the inverter circuit must be series-connected to a filter inductor, thereby adding to the system construction cost and volume.

SUMMARY

It is an objective of the present invention to allow load unbalance of a single-phase three-wire system to undergo unbalanced current compensation so as to enhance the stability and reliability of a power supply system.

Another objective of the present invention is to provide a single-phase three-wire inverter circuit with an inverter axis which need not be series-connected to an inductor, so as to reduce costs.

In order to achieve the above and other objectives, the present invention provides a mixed power supply device, comprising: a power supply component for providing a DC voltage; a DC-DC conversion module coupled to the power supply component to receive the DC voltage, perform voltage level conversion on the DC voltage and output a stable DC voltage; a current transformation module coupled between the DC-DC conversion module and a load to receive the stable DC voltage and convert the stable DC voltage into an AC voltage, so as to supply power to the load; and a merging network switching switch coupled to the current transformation module to connect the current transformation module and a utility power network in parallel or disconnect the current transformation module from the utility power network, so as for the load to receive merging network mode-based power supply or standalone mode-based power supply, wherein, in the merging network mode, the current transformation module performs unbalanced current compensation on load unbalance of the load.

In an embodiment of the present invention, the DC-DC conversion module comprises a bidirectional DC-DC converter, a first current controller, a first switch, a second switch, a DC voltage controller, a charging controller and a power controller, with the first current controller coupled between the bidirectional DC-DC converter and the first switch, and the first switch coupled to the second switch and the DC voltage controller, to thereby enable switching between the second switch and the DC voltage controller according to functional requirements, with the second switch coupled to the charging controller and the power controller, to thereby enable switching between the charging controller and the power controller according to functional requirements.

In an embodiment of the present invention, the current transformation module comprises: an AC voltage controller for adjusting a voltage of the load; an inverter having an input end and an output end, with the input end coupled to the bidirectional DC-DC converter and the DC voltage controller, and the output end coupled to the AC voltage controller and the load; a load unbalance controller for performing unbalanced current compensation on the load; a third switch coupled to the AC voltage controller and the load unbalance controller to enable switching between the AC voltage controller and the load unbalance controller according to functional requirements; a second current controller coupled to the inverter and the third switch; and a multiplier coupled to the load unbalance controller.

In an embodiment of the present invention, in the merging network mode, an input end of the utility power network is coupled to a phase-locked loop module, and the multiplier is coupled between the DC voltage controller and the phase-locked loop module, thereby allowing the unbalanced current compensation to be performed with the phase-locked loop module, the DC voltage controller, the multiplier and the load unbalance controller.

In an embodiment of the present invention, the phase-locked loop module generates a synchronization signal in synchrony with the utility power network, and the DC voltage controller generates an adjustment signal, wherein the synchronization signal and the adjustment signal are computed with the multiplier to generate a command current, wherein the command current and a load current of the load undergo internal computation by the load unbalance controller such that the load undergoes the unbalanced current compensation, thereby generating and sending a balanced current to the second current controller.

In an embodiment of the present invention, the inverter has a plurality of switch components, and the second current controller performs logical computation on the balanced current and an output current generated from the inverter so as to generate a control signal for controlling the switching of the switch components in the inverter and ensuring that a current waveform of a feeding utility power is a sinusoidal wave by pulse width modulation.

In an embodiment of the present invention, in the merging network mode, the first switch is coupled to the second switch, and the DC-DC conversion module is switched by the second switch to one of a charging mode and a feeding mode, wherein, in the charging mode, the second switch selects the charging controller to generate a current command such that the utility power network charges the power supply component, wherein, in the feeding mode, the second switch selects the power controller to generate a current command such that the power supply component feeds power to the utility power network.

In an embodiment of the present invention, in the standalone mode, the first switch is coupled to the DC voltage controller, the third switch selects the AC voltage controller to generate a current command, so as to adjust a voltage of the load, wherein the power supply component provide a DC voltage, and the DC voltage is converted with the DC-DC conversion module and the current transformation module to supply power to the load.

In an embodiment of the present invention, the power supply component is a storage battery or a solar power supply module, and the bidirectional DC-DC converter has a current source push-pull circuit framework, wherein the inverter has a single-phase three-wire circuit framework.

In an embodiment of the present invention, the DC voltage controller, the AC voltage controller, the first current controller and the second current controller are each a proportional controller, a proportional integral controller, or a second-type controller, wherein the second-type controller comprises a proportional integral controller and a low-pass filter.

Therefore, the present invention is characterized in that load unbalance of a single-phase three-wire system undergoes unbalanced current compensation to enhance the stability and reliability of a power supply system. Furthermore, a mixed power supply system of the present invention dispenses with a transformer and a filter inductor and therefore reduces system volume and weight, thereby reducing costs.

BRIEF DESCRIPTION

Figure 2:
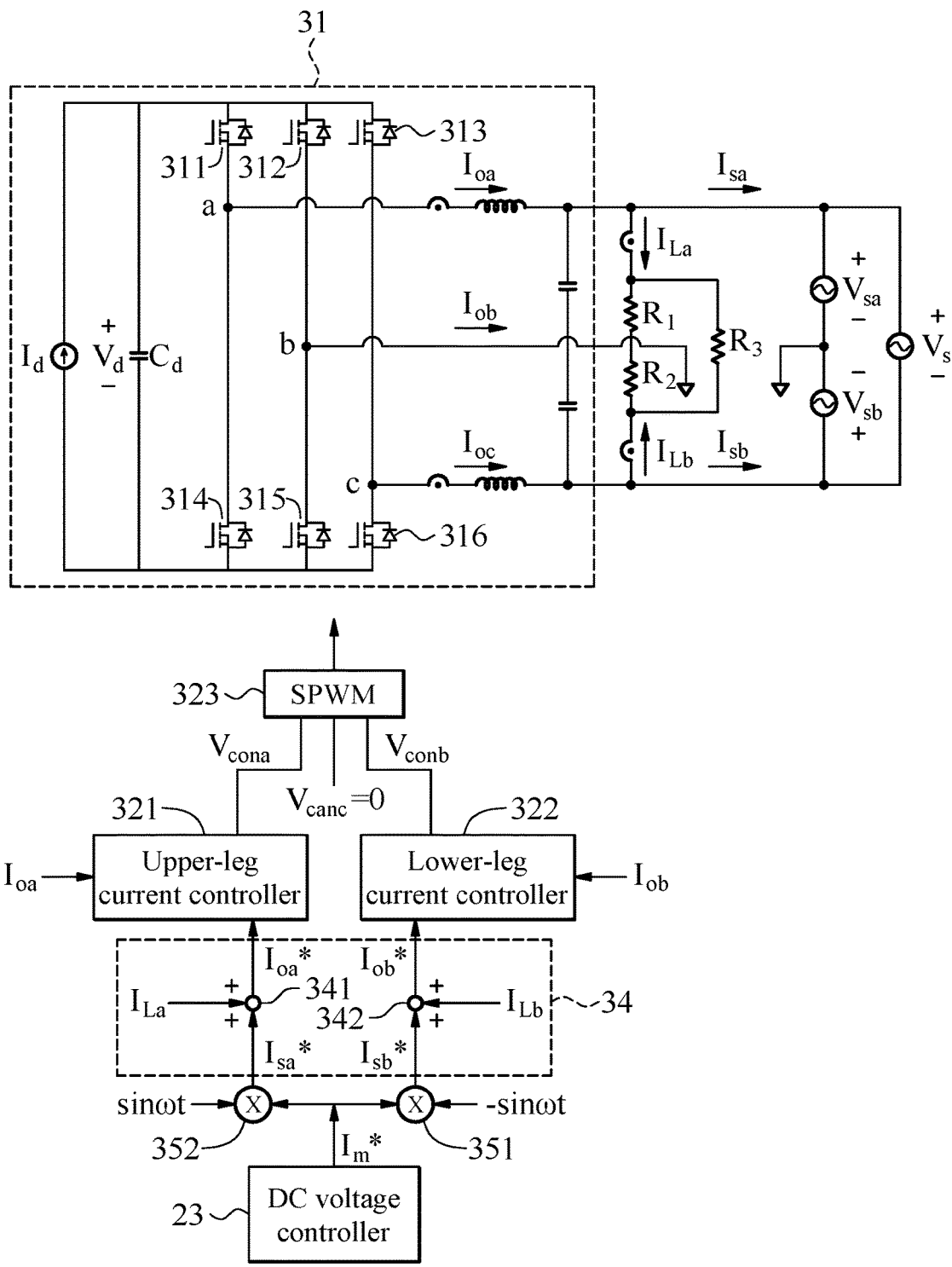

Objectives, features, and advantages of the present invention are hereunder described in detail and illustrated with specific embodiments in conjunction with the accompanying drawings, in which:

FIG. 1 is a schematic view of the control framework of a mixed power supply device in an embodiment of the present invention; and FIG. 2 is a schematic view of the control framework of a current transformation module parallel-connected to a utility power network in an embodiment of the present invention.

DETAILED DESCRIPTION

FIG. 1 is a schematic view of the control framework of a mixed power supply device in an embodiment of the present invention. Referring to FIG. 1, in this embodiment, a mixed power supply device 100 is provided. The mixed power supply device 100 comprises a power supply component 1, a DC-DC conversion module 2, a current transformation module 3 and a merging network switching switch MSW. The power supply component 1 provides a DC voltage. The DC-DC conversion module 2 is coupled to the power supply component 1 to receive the DC voltage, so as to perform voltage level conversion on the DC voltage and output a stable DC voltage. The current transformation module 3 is coupled between the DC-DC conversion module 2 and a load 4. The current transformation module 3 receives the stable DC voltage and converts the stable DC voltage into an AC voltage, so as to supply power to the load 4. The merging network switching switch MSW is coupled to the current transformation module 3 and adapted to connect the current transformation module 3 and a utility power network 5 in parallel or disconnect the current transformation module 3 from the utility power network 5, so as for the load 4 to receive merging network mode-based power supply or standalone mode-based power supply. In the merging network mode, the current transformation module 3 performs unbalanced current compensation on load unbalance of the load 4.

Referring to FIG. 1, in an embodiment, the DC-DC conversion module 2 comprises a bidirectional DC-DC converter 21, a first current controller 22, a first switch SW1, a second switch SW2, a DC voltage controller 23, a charging controller 24 and a power controller 25. The first current controller 22 is coupled between the bidirectional DC-DC converter 21 and the first switch SW1. The first switch SW1 is coupled to the second switch SW2 and the DC voltage controller 23. The second switch SW2 is coupled to the charging controller 24 and the power controller 25. The current transformation module 3 comprises: an AC voltage controller 33 for adjusting the voltage of the load 4; an inverter 31 having an input end and an output end, with the input end coupled to the bidirectional DC-DC converter 21 and the DC voltage controller 23, and the output end coupled to the AC voltage controller 33 and the load 4; a load unbalance controller 34 for performing unbalanced current compensation on the load 4; a third switch SW3 coupled to the AC voltage controller 33 and the load unbalance controller 34; a second current controller 32 coupled to the inverter 31 and the third switch SW3; and a multiplier 35 coupled to the load unbalance controller 34.

In an embodiment, both the DC-DC conversion module 2 and the current transformation module 3 adopt current control and use the first switch SW1 and the third switch SW3 to select a current command, respectively. In the merging network mode, the inverter 31 is parallel-connected to the utility power network 5 through the merging network switching switch MSW, and the DC-DC conversion module 2 is switched by the second switch SW2 to a charging mode or a feeding mode, wherein the current command of the bidirectional DC-DC converter 21 is generated from the first switch SW1 and the second switch SW2. To charge the power supply component 1 with the utility power network 5, the second switch SW2 selects the charging controller 24 to generate the current command. To feed power to the utility power network 5 with the power supply component 1, the second switch SW2 selects the power controller 25 to generate the current command. In this embodiment, the input end of the utility power network 5 is coupled to a phase-locked loop module 6, and the multiplier 35 is coupled between the DC voltage controller 23 and the phase-locked loop module 6. The phase-locked loop module 6 generates a synchronization signal sin ωt in synchrony with utility power, and the DC voltage controller 23 generates an adjustment signal $I_m{}^*$, wherein the synchronization signal sin ωt and the adjustment signal $I_m{}^*$ undergo computation by the multiplier 35 and the load unbalance controller 34 to thereby generate a current command. Afterward, after being adjusted with the second current controller 32, the current waveform fed (or drained) to the utility power network 5 is a sinusoidal wave with a power factor of 1, thereby compensating for the current unbalanced, power harmonics and virtual work loss of the load 4.

FIG. 2 is a schematic view of the control framework of a current transformation module parallel-connected to the utility power network in an embodiment of the present invention. Referring to FIG. 2, according to this embodiment, in the merging network mode, a way of performing unbalanced current compensation on load unbalance is described. Referring to FIG. 2, the inverter 31 has a single-phase three-wire circuit framework. The inverter 31 has an upper-leg a, a central leg c and a lower-leg b, with output currents $I_{oa}$, $I_{oc}$, $I_{ob}$ corresponding to the upper-leg a, the central leg c and the lower-leg b, respectively, and load currents $I_{La}$, $I_{Lb}$ corresponding to unbalanced loads $R_1$, $R_2$, respectively. First, the phase-locked loop module 6 generates a synchronization signal sin ωt in synchrony with the utility power network 5, and the DC voltage controller generates an adjustment signal $I_m^*$, wherein the synchronization signal sin ωt and the adjustment signal $I_m^*$ undergo computation by two multipliers 351, 352 to generate two command currents $I_{sa}^*$, $I_{sb}^*$ corresponding to the upper-leg a and the lower-leg b, respectively. The command currents $I_{sa}^*$, $I_{sb}^*$ and the load currents $I_{La}$, $I_{Lb}$ are computed with two adders 341, 342 to thereby output two balanced currents $I_{oa}^*$, $I_{ob}^*$, respectively. Then, the balanced currents $I_{oa}^*$, $I_{ob}^*$ and the output currents $I_{oa}$, $I_{ob}$ are adjusted with an upper-leg current controller 321 and a lower-leg current controller 322 to generate control voltages $V_{cona}$, $V_{conb}$ corresponding to the upper-leg a and the lower-leg b, respectively. Assuming that control voltage $V_{conc}$ of the central leg c is zero, the control voltages $V_{cona}$, $V_{conb}$ can be input to a sinusoidal pulse width modulator (SPWM) 323 to control the switching of switch components 311~316 in the inverter by pulse width modulation such that the current waveform of the feeding utility power is a sinusoidal wave.

Referring to FIG. 1, in an embodiment, when the current transformation module 3 is disconnected from the utility power network 5 and therefore operates in a standalone mode, the first switch SW1 switches to the DC voltage controller 23, and the third switch SW3 selects the AC voltage controller 33 to generate a current command for adjusting the voltage of the load 4. The power supply component 1 provides a DC voltage. The DC voltage is converted with the DC-DC conversion module 2 and the current transformation module 3 to supply power to the load 4.

In an embodiment, for example, the bidirectional DC-DC converter has a current source push-pull circuit framework, and the power supply component is a storage battery or a solar power supply module.

In an embodiment, the DC voltage controller, the AC voltage controller, the first current controller and the second current controller are each a proportional controller, a proportional integral controller, or a second-type controller, wherein the second-type controller comprises a proportional integral controller and a low-pass filter.

Compared with the prior art, the present invention is characterized in that load unbalance of a single-phase three-wire system undergoes unbalanced current compensation to enhance the stability and reliability of a power supply system. Furthermore, a mixed power supply system of the present invention dispenses with a transformer and a filter inductor and therefore reduces system volume and weight, thereby reducing costs.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:
1. A mixed power supply device, comprising:
   a power supply component for providing a DC voltage;
   a DC-DC conversion module coupled to the power supply component to receive the DC voltage, perform voltage level conversion on the DC voltage and output a stable DC voltage;
   a current transformation module coupled between the DC-DC conversion module and a load to receive the stable DC voltage and convert the stable DC voltage into an AC voltage, so as to supply power to the load; and
   a merging network switching switch coupled to the current transformation module to connect the current transformation module and a utility power network in parallel or disconnect the current transformation module from the utility power network, so as for the load to receive merging network mode-based power supply or standalone mode-based power supply,
   wherein, in the merging network mode, the current transformation module performs unbalanced current compensation on load unbalance of the load,
   wherein the DC-DC conversion module comprises a bidirectional DC-DC converter, a first current controller, a first switch, a second switch, a DC voltage controller, a charging controller and a power controller, with the first current controller coupled between the bidirectional DC-DC converter and the first switch, and the first switch coupled to the second switch and the DC voltage controller, to thereby enable switching between the second switch and the DC voltage controller according to functional requirements, with the second switch coupled to the charging controller and the power controller, to thereby enable switching between the charging controller and the power controller according to functional requirements.

2. The mixed power supply device of claim 1, wherein the current transformation module comprises:
   an AC voltage controller for adjusting a voltage of the load;
   an inverter having an input end and an output end, with the input end coupled to the bidirectional DC-DC converter and the DC voltage controller, and the output end coupled to the AC voltage controller and the load;
   a load unbalance controller for performing unbalanced current compensation on the load;
   a third switch coupled to the AC voltage controller and the load unbalance controller to enable switching between the AC voltage controller and the load unbalance controller according to functional requirements;
   a second current controller coupled to the inverter and the third switch; and
   a multiplier coupled to the load unbalance controller.

3. The mixed power supply device of claim 2, wherein, in the merging network mode, an input end of the utility power network is coupled to a phase-locked loop module, and the multiplier is coupled between the DC voltage controller and the phase-locked loop module, thereby allowing the unbalanced current compensation to be performed with the phase-locked loop module, the DC voltage controller, the multiplier and the load unbalance controller.

4. The mixed power supply device of claim 3, wherein the phase-locked loop module generates a synchronization signal in synchrony with the utility power network, and the DC voltage controller generates an adjustment signal, wherein the synchronization signal and the adjustment signal are computed with the multiplier to generate a command current, wherein the command current and a load current of the load undergo internal computation by the load unbalance controller such that the load undergoes the unbalanced current compensation, thereby generating and sending a balanced current to the second current controller.

5. The mixed power supply device of claim 4, wherein the inverter has a plurality of switch components, and the second current controller performs logical computation on the balanced current and an output current generated from the inverter so as to generate a control signal for controlling the switching of the switch components in the inverter and ensuring that a current waveform of a feeding utility power is a sinusoidal wave by pulse width modulation.

6. The mixed power supply device of claim 2, wherein the DC voltage controller, the AC voltage controller, the first current controller and the second current controller each comprise one selected from the group consisting of a proportional controller, a proportional integral controller and a second-type controller, wherein the second-type controller comprises a proportional integral controller and a low-pass filter.

7. The mixed power supply device of claim 1, wherein, in the merging network mode, the first switch is coupled to the second switch, and the DC-DC conversion module is switched by the second switch to one of a charging mode and a feeding mode, wherein, in the charging mode, the second switch selects the charging controller to generate a current command such that the utility power network charges the power supply component, wherein, in the feeding mode, the second switch selects the power controller to generate a current command such that the power supply component feeds power to the utility power network.

8. The mixed power supply device of claim 1, wherein, in the standalone mode, the first switch is coupled to the DC voltage controller, the third switch selects the AC voltage controller to generate a current command, so as to adjust a voltage of the load, wherein the power supply component provides the DC voltage, and the DC voltage is converted with the DC-DC conversion module and the current transformation module to supply power to the load.

9. The mixed power supply device of claim 1, wherein the power supply component is one of a storage battery and a solar power supply module, wherein the bidirectional DC-DC converter has a current source push-pull circuit framework, wherein the inverter has a single-phase three-wire circuit framework.

* * * * *